(12) United States Patent
Heck

(10) Patent No.: US 7,941,383 B2
(45) Date of Patent: May 10, 2011

(54) MAINTAINING STATE TRANSITION DATA FOR A PLURALITY OF USERS, MODELING, DETECTING, AND PREDICTING USER STATES AND BEHAVIOR

(75) Inventor: Larry P. Heck, Los Altos, CA (US)

(73) Assignee: Yahoo! Inc., Sunnyvale, CA (US)

(*) Notice: Subject to any disclaimer, the term of this patent is extended or adjusted under 35 U.S.C. 154(b) by 712 days.

(21) Appl. No.: 11/962,753

(22) Filed: Dec. 21, 2007

(65) Prior Publication Data

US 2009/0164395 A1 Jun. 25, 2009

(51) Int. Cl.
*G06E 1/00* (2006.01)
(52) U.S. Cl. .......................................... 706/21
(58) Field of Classification Search .................. 706/16, 706/12, 45–47; 707/706, 708–709
See application file for complete search history.

(56) References Cited

U.S. PATENT DOCUMENTS

| | | | | |
|---|---|---|---|---|
| 2005/0055426 A1* | 3/2005 | Smith et al. | | 709/219 |
| 2006/0271520 A1* | 11/2006 | Ragan | | 707/3 |
| 2008/0222242 A1* | 9/2008 | Weiss et al. | | 709/203 |
| 2008/0222268 A1* | 9/2008 | Miyamoto et al. | | 709/217 |
| 2008/0228537 A1* | 9/2008 | Monfried et al. | | 705/7 |
| 2009/0006363 A1* | 1/2009 | Canny et al. | | 707/5 |
| 2009/0055436 A1* | 2/2009 | Ayeni | | 707/104.1 |

OTHER PUBLICATIONS

Deshpande et al., Selective Markov MOdels for Predicting Web PAge Accesses, 2004, ACM Transactions on Internet Technology, vol. 4. No. 2, pp. 163-184.*
"Hidden Markov model" downloaded from the Internet on Feb. 26, 2008 < http://en.wikipedia.org/wiki/Hidden_Markov_model > 5 pages.
"Hidden Markov Models" downloaded from the Internet on Feb. 26, 2008 < http://www.cs.brown.edu/research/ai/dynamics/tutorial/Documents/HiddenMarkovModels.html > 6 pages.

* cited by examiner

*Primary Examiner* — David R Vincent
(74) *Attorney, Agent, or Firm* — Hickman Palermo Truong & Becker LLP; Daniel D. Ledesma

(57) ABSTRACT

Mechanisms model, detect, and predict user behavior as a user navigates the Web. In one embodiment, mechanisms model user behavior using predictive models, such as discrete Markov processes, where the user's behavior transitions between a finite number of states. The user's behavior state may not be directly observable (e.g., a user does not proactively indicate what behavior state he is in). Thus, the behavior state of a user is usually only indirectly observable. Mechanisms use predictive models, such as hidden Markov models, to predict the transitions in the user's behavior states.

26 Claims, 3 Drawing Sheets

MAINTAINING STATE TRANSITION DATA FOR A PLURALITY OF USERS, MODELING, DETECTING, AND PREDICTING USER STATES AND BEHAVIOR

BACKGROUND

A variety of mechanisms are available to help users search and navigate electronic information. For example, many electronic resources employ a search engine to help users locate information. To locate information on a particular topic, a search engine allows users to submit one or more search query terms related to a topic of interest. In response, the search engine executes the search query, consults its indexes, and generates information about the results of the search. The information about the results of the search, referred to herein as the "search results", usually contains a list of resources that satisfy the search query and some attributes of those sources.

While search engines may be applied in a variety of contexts, one common use is navigating through document repositories by searching for documents of interest. Therefore, web search engines are especially useful for locating resources that are accessible on the Internet, as the Internet can be thought of as a large repository of resources. Many searching techniques may be used by Internet search engines. For example, an Internet search engine might read or "crawl" pages on the Internet to create entries for a search index, and then use that index when determining which pages are relevant to a search query. Accordingly, current web search engines have very large document indexes, which means that the web search engines can provide deep coverage of Internet resources.

The resources identified in Internet search results often include files whose content is composed in a page description language such as Hypertext Markup Language (HTML). Such files are typically called web pages. Using a web browser, a web page may be retrieved by entering its Universal Resource Locator (URL) in a web browser. A URL is basically the electronic address of a web page. Internet search results may therefore be presented to a user as a list of hypertext links to the URLs of matching resources. Users retrieve a document or resource of interest found in a search by selecting, in a web browser, the resource's hypertext link or URL found in the search results.

Unfortunately, search results may contain so many matching resources that a user may be overwhelmed by the results. Therefore, a number of techniques have been designed to assist the user in their search. For example, search results frequently include a short description or "abstract" with each matching resource. Abstracts are relatively short, so that a user may quickly judge the relevance of a matching resource listed in the search results. These abstracts may be contextual or static. A contextual abstract is one that is generated dynamically based on the search query terms submitted by a user. A static abstract is a short summary of the contents of a web page. This can be algorithmically determined by a computer program, or input by a user (e.g., typically, by the web page's publisher). By viewing an abstract, a user can quickly determine if a matching resource is relevant to their search.

As useful as abstracts and other search tool features may be in helping a user find useful information, conventional searching techniques still have limitations. For example, web search engines rely almost exclusively on search terms provided by a user to find and display information to a user. As other examples, search engines do not take into account where users has been or what the user's web search behavior has been like. As a result, the search results suggested by a search engine are heavily based on the search terms and do not take into account other forms of data that may be useful in helping a user find useful and interesting information on the web.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
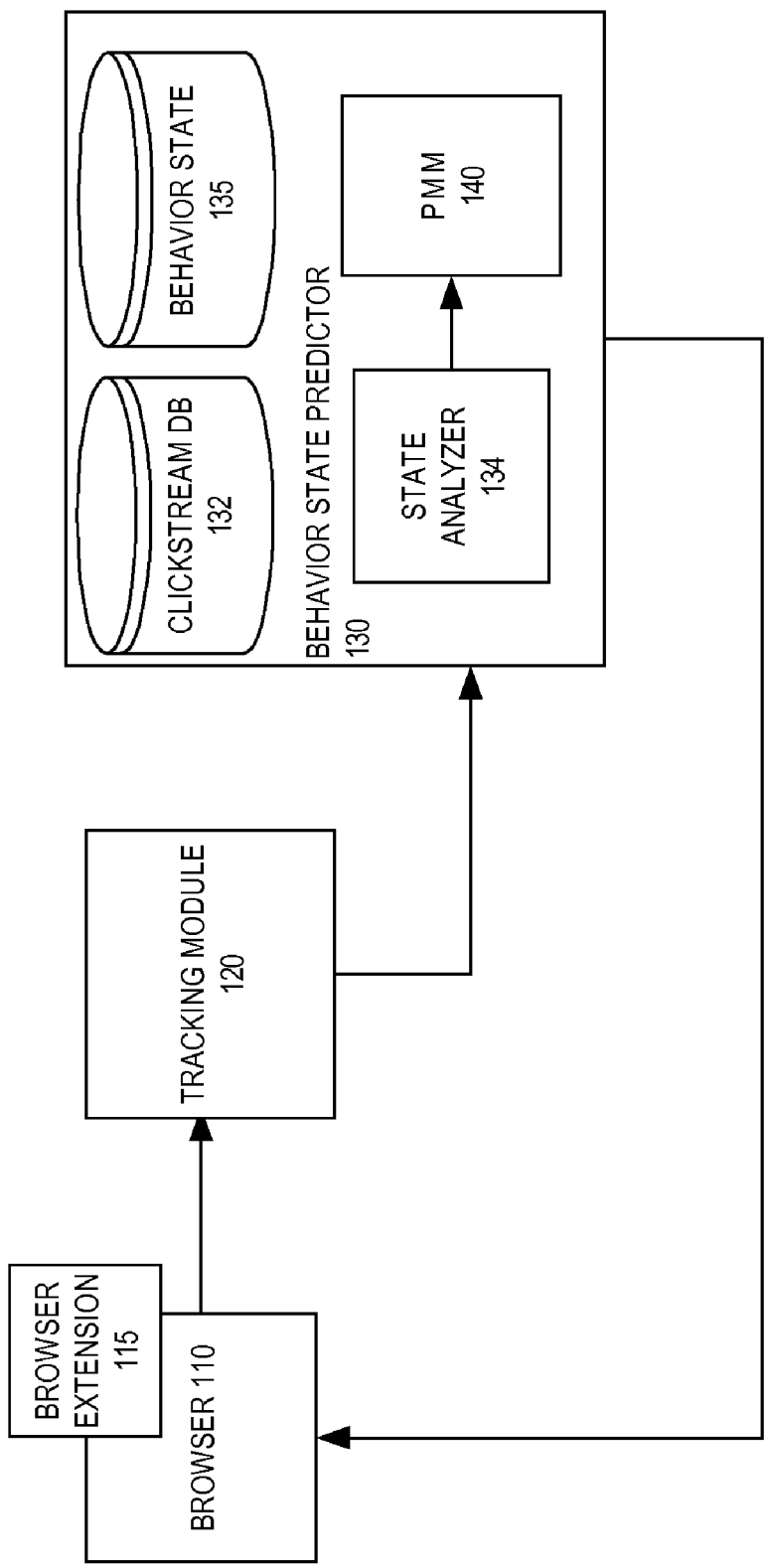
FIG. 1 illustrates a block diagram of an example environment for collecting, generating, and displaying predictive data.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview

Mechanisms model, detect, and predict user behavior as a user navigates the Web. In one embodiment, mechanisms model user behavior using predictive models, such as discrete Markov processes, where the user's behavior transitions between a finite number of states. The user's behavior state, according to one embodiment, is not directly observable (e.g., a user does not proactively indicate what behavior state he is in). Thus, the behavior state of a user is usually only indirectly observable. For example, suppose a user is browsing the Internet looking for information on home theater systems. Based on the sites the user visits, mechanisms may be deduce the user is in a "browsing" behavior state (e.g., the time the user spends browsing for information may be a "browsing" behavior state). Then, after the user finds the information on home theater systems, he may transition to a different behavior state (e.g., a purchasing state). In one embodiment, mechanisms use predictive models, such as hidden Markov models, to predict the transitions in the user's behavior states.

In one embodiment, mechanisms implement both a machine learning procedure to train the predictive models, as well as procedures for detecting, classifying, and predicting user behavior.

Mechanisms for detecting, classifying, and predicting are particularly useful for personalizing the user's web experience. The mechanisms provide information from the web that is targeted to the specific interests of a user based on their past usage patterns as well as known profile (e.g., demographics, geo-location, associations or affiliations with other groups/ individuals). For example, in web and sponsored search, search results and sponsored advertisements most relevant to a particular individual can be returned in a targeted manner. This capability is important as it can be used to increase the quality of the user's search experience.

Web-Based Environment

Even though the mechanisms described herein are described in terms of a search engine and/or Internet environment, these environments are meant only to serve as exemplary environments in which the techniques of the present invention are employed. In alternative implementations, the techniques may be employed in other environments. For example, the techniques could be employed outside a web browser in a news reader application, or desktop search application, or document editor.

Example Search Engine

In addition, many of the mechanisms described herein are discussed in connection with a search engine. In one embodiment, a search engine is a web search engine. The search engine executes search queries and generates search results using indexes to find related references, links, and other information stored in connected repositories. In one embodiment, the search engine also implements a state predictor. Moreover, the search engine includes software tools that capture clickstream data and demographic information from users, analyzes the data, and generates predictive data based on the clickstream and demographic information.

Predictive Data

Mechanisms are described herein for displaying predictive data to a user as the user browses web pages. "Predictive data" as used herein refers to data that is displayed to a user based on a perceived behavior state of the user and a predicted future behavior state. When users browse the Web, they tend to transition between a finite number of "behavior states", where a behavior state is defined as a period of time where the user exhibits statistically similar behavior.

To illustrate, suppose a user is interested in buying a new digital camera. The process of buying the digital camera can be broken up into a series of behavior states. For example, the user may start the process by visiting several web sites to research digital cameras to familiarize himself with basic terminology and to learn the advantages and disadvantages of digital cameras over traditional film cameras. While he is researching digital cameras, note that many of the web sites he visits are similar. The user can remain in that behavior state for as long or as little time as he wants. Eventually, however, he may transition to a second state. In the second state, the user visits web pages that discuss the types of features available on digital cameras. Once the user has become familiar with the terminology and features of digital cameras, the user may then transition to a third behavior state where he begins visiting web pages that include online reviews and expert opinions to see which digital cameras are recommended (e.g., which are the most reliable, best bang for the buck, etc.). Next, the user transitions to a fourth behavior state as he begins researching specific camera models based on the recommendations he read. This fourth behavior state may include researching how much cameras cost, their availability, if there are any promotional offers, and so forth. Finally, the user enters a final behavior state. The user accesses an online retailer and purchases a digital camera.

Transitions between states may have predictable patterns. Once a particular state is entered, then future behavior states can be predicted. Predictive data can be displayed to a user based on predicted future states.

As future behavior states are predicted, predictive data can be displayed as part of the web pages themselves (e.g., as ads or links to other web pages). On the other hand, the predictive data may be displayed in a separate user interface or pop-up window. For example, suppose a user browses to a web page in a web browser, user interface controls built into the web browser (or generated by a tool associated with the web browser) display predictive data to the user. It should be noted that predictive data can include a wide range of information. Examples of predictive data include information derived from (1) behavior state data, (2) search engine data, and (3) sponsor-based data. Each of these types of predictive data will be described in greater detail hereafter.

Behavior State Data

Behavior state data generally refers to information associated with a particular behavior state. It can refer to clickstream data that has been captured as users browse the Internet, analyzed, and then grouped into behavior states. For example, suppose a user accesses several automobile websites in a row, then eventually transitions to a car purchasing web page that information is collected and analyzed. Once analyzed, it may be determined that the user was in a "car researching" behavior state and then transitioned into a "car purchasing" state. The transitions are recorded and saved, along with the information about the web pages associated with each behavior state. When a subsequent user is in the "car purchasing" state (even if they are not accessing the same web pages as the previous user), he may be shown information from the "car purchasing" state since users in a "car researching" state eventually transition to the "car purchasing" state.

The clickstream data used to define behavior state data includes URLs, web page transition information (e.g., what web page a user was accessing and what web page(s) the user subsequently accesses), user demographic information, statistical or metric information (e.g., how long a user spent browsing a web page, how often the user accesses the web page, etc.). In one embodiment, clickstream data is forwarded to a tracking module as described below to be analyzed and refined into behavior state data.

In one embodiment, clickstream data is collected from many users to identify behavior state patterns in the users' browsing histories.

In one embodiment, when a user accesses a web page, the web browser for the user receives and displays, among other data, predictive data. For example, in the scenario described above, when a user accesses a car researching web page, the user's web browser may display a link to the car purchasing web pages since the next behavior state is expected to be a car purchasing state. In this way, behavior state data facilitates access to online information that may be useful or of interest to the user.

In one embodiment, behavior state data is dynamically updated in the user's web browser as the user transitions from one behavior state to the next. In one embodiment, the updates may occur when the user transitions from one web page to another. In addition, in one embodiment, the behavior state data may change over time (e.g., to reflect new products, associations, or trends).

Search Engine Data

In addition to behavior state data, predictive data can include search engine data. Search engine data generally refers to any information generated and indexed by a search engine. Search engine data can include static abstracts, active abstracts, additional links related to a particular web page, search results based on search queries, related topics and keywords, other suggested queries, and other such information. Search engine data also includes other data and metadata about a page, e.g., publisher, date, author, tags, text from a web page, data from other repositories, etc. In one embodiment, some search engine data may be indexed by a behavior state.

Sponsor-Based Data

Predictive data can also include sponsor-based data. Sponsor-based data refers to information associated with a behavior state by an advertiser or web page publisher ("sponsor"). The process of submitting sponsor-based data to a search engine varies. However, the typical example of sponsor-based data involves the sponsor establishing an online account with a search engine and submitting data to the search engine. For example, through an online account, a sponsor accesses links to submits specific information that they would like to be displayed whenever a user is in a particular behavior state. Sponsor-based data can include links to other web pages, promotional offers, metadata about a page, keywords, and other related topics that may be useful to a user browsing in a particular behavior state.

Exemplary System

FIG. 1 illustrates an exemplary system 100 for collecting, modeling, and displaying predictive data to a user. In one embodiment, system 100 is a component of a search engine. Tools to collect, generate, and display predictive data in system 100 are illustrated in FIG. 1. In one embodiment, those tools include browser 110, tracking module 120, and state predictor 130. In other embodiments, system 100 may include a different set of tools and components.

The Browser

Browser 110 generally represents any software tool that allows a user to browse, navigate or view electronic documents. For example, browser 110 may be a web browser, a document viewer, RSS newsreader, mail client, document editor, a database client application, or other software tool for navigating a document corpus.

In one embodiment, browser 110 includes browser extension 115. Browser extension 115 can be a stand-alone application such as a desktop application, screen saver, or some other application. Alternatively, browser extension 115 is a tool designed to work in connection with browser 110. For example, browser extension 115 can be a module of, extension to, or plug-in for browser 110. In one embodiment, browser extension 115 is a toolbar application installed and integrated into browser 110. Browser extension 115 provides a variety of features to the user. For example, browser extension provides a sign-in feature, a search function, links to other web pages, and other such features. In one embodiment, browser extension 115 communicates with tracking module 120 upon user sign-in.

In one embodiment, sign-in may be implicit upon launch of the browser.

Tracking Module

In one embodiment, tracking module 120 is an application programming interface file, a dynamic link library file, a separate application, an integrated component of browser 110. Alternatively, it is a software component of a search engine and defines an interface between browser 110 and state predictor 130. According to one embodiment, tracking module 120 collects web page addresses and other clickstream data from browser 110 and forwards the information to state predictor 130. Clickstream data can include user search queries, page-views, non-search-based browsing, web usage history, and search history. Alternatively, tracking module may use cookies, such as b-cookies, to keep track of where a user browses.

In one embodiment, tracking module 120 forwards clickstream data to the state predictor at the time the clickstream data is collected (e.g., tracking module 120 forwards the clickstream data for a web page upon accessing the page). Alternatively, tracking module 120 collects clickstream data from one or more web pages and sends it to the search engine at predetermined intervals or when a certain amount of clickstream data has been collected.

In one embodiment, tracking module 120 captures a single web page address and forwards the web page address to the state predictor independently of other information. The state predictor uses a predictive model to determine what behavior state a user is in based on the web page address. Based on what behavior state the user is in, the state predictor can display predictive data to the user that allows him to transition from one behavior state to the next.

For example, suppose a user is reading a web page that outlines the best way to cook a turkey. The web page (or at least its URL) is captured by browser extension 115 and forwarded to state predictor 130. State predictor 130 determines that the user is in a "recipe finding" state. State predictor 130 then computes, using a predictive model, what the user's next behavior state will be. In one embodiment, based on previous users' experiences, the predictive data displayed to users relates to "buying a turkey" or "buying a turkey fryer" or some other cooking related behavior state.

Predictive data is displayed, in one embodiment, using user interface controls that are a part of browser extension 115.

In one embodiment, tracking module 120 may perform some initial analysis on a clickstream before sending the clickstream to state predictor 130. For example, tracking module 120 may remove personal information (e.g., name, age, address, social security number, etc.), credit card information, or other sensitive information before sending a clickstream. In one embodiment, browser extension 115 provides user interface controls that allow the user to selectively choose what information is filtered by tracking module 120.

In one embodiment, a login may not be required to have behavior states tracked. However, in order to quell privacy concerns, in one embodiment, only anonymous or general demographic data is sent by tracking module 120 to the state predictor 130.

Example Operation

Suppose a user opens browser 110 with an integrated browser extension 115, such as an integrated search engine toolbar. In this example, clickstream data is collected by tracking module 120 that interfaces with the browser extension 115 and state predictor 130. According to one embodiment, before any clickstream data is collected, the user is prompted to register with a search engine or other entity that controls state predictor 130. The process of registering is generally well-known and is not discussed in detail herein. It should be noted, however, that registering can include an initial registration process and additional sign-in processes once the initial registration is complete. The prompt to register (or sign-in) with a search engine should include a full disclosure of any mechanism that may be used to track Web usage. Moreover, by prompting a user to register, it allows users to opt into the behavior tracking service.

Once a user has registered, in one embodiment, browser extension 115 can activate tracking module 120. By activating tracking module 120, it begins to collect clickstream data as the user navigates from one web page to the next. The amount of clickstream data captured by tracking module 120 varies. Factors that influence the amount of clickstream data collected include the type of web page being browsed, how much information is associated with a web page, what type of information is allowed to be collected, how often the clickstream data is to be sent to the search engine, what type of information the search engine requires to identify behavior states, and other such factors.

For example, suppose a user browses to a web page that does not have much information either on the web page itself or in the web page's associated metadata. Accordingly, the amount of clickstream data collected by tracking module 120 about this particular web page may be small. Tracking module 120 may only collect the web page address the user was browsing just prior to the current web page and the current web page address.

Alternatively, the user may browse to a web page rich with content. In this example, more clickstream data may be collected by tracking module 120. For example, the collected clickstream data may include the URL for the current web page, the web page's title and publisher information, publication date, email addresses embedded in the web page, keywords automatically generated by an analysis of the web page's content by the browser extension, statistical information such as the time spent on the web page, graphic images, links to other web pages extracted from the web page's content by the browser extension, and other such information. The clickstream data may also include a user's browsing history (e.g., what URLs the user accessed while they have been browsing the web).

To illustrate, suppose a user accesses a automobile maker's web page to browse its latest models. Then, suppose, the user navigates to an automobile dealer's web page to view the inventory on a select vehicle. The transition from the automobile maker's web page to the automobile dealer's web page is included in the clickstream collected by tracking module 120 and forwarded to state predictor 130. If the user later transitions from the automobile dealer's web page to a purchase vehicle webpage, that transition is also recorded by tracking module 120.

In other words, tracking module collects clickstream data and sends it to state predictor 130. Upon receipt of the clickstream data, state predictor 130 stores it until the clickstream data can be analyzed.

Behavior State Predictor

Predictive models such as Hidden Markov models (HMMs) have been shown to be particularly effective at modeling dynamic systems that transition between a finite number of states. For user behavioral modeling, these states are "hidden" in that they are not directly observable and therefore must be inferred from logged user events (e.g., rich click stream, page-views, etc). Therefore, each state of the HMM is a statistical model representing the likelihood that the particular observed (logged) event was generated by a user in a particular behavior state. Transitions between behavior states can also be modeled by the transition probabilities of the HMM.

State predictor 130 includes software tools to analyze clickstream data in order to generate the finite set of states needed to model user behavior. In one embodiment, predictive data is generated by state predictor 130 and sent to browser 110 for display to the user. In one embodiment, state predictor 130 includes clickstream repository 132, a predictive model module (PMM) 140, behavior state analyzer 134, and behavior state data repository 135. In other embodiments, state predictor 130 may include a different set of components.

Clickstream repository 132 generally refers to a repository, such as a database, for storing clickstream data received from tracking module 120. In one embodiment, clickstream repository 132 collects clickstream data from multiple users.

Behavior state data repository 135 generally refers to a repository, such as a database, for creating and indexing behavior states with associated data (such as the next state, links to relevant web pages, and other such information).

State Analyzer

State analyzer 134 is a software tool that analyzes the accumulated clickstream data in clickstream repository 132 in order to, among other things, find trends and common behavior state patterns in the way users' browse the Web. State analyzer 134 evaluates the clickstream data in clickstream repository 132 to identify behavior states patterns, create entries for the behavior states behavior state repository 135, and link behavior states together. For example, suppose a user opens his web browser to a sports-related web page and navigates to a specific sports team web page and browses a box score of the team's latest win. That information is captured by tracking module 120 and sent to clickstream repository 132. In one embodiment, state analyzer 134 analyzes that information to determine what behavior state a user is in.

It should be noted, that the behavior states themselves are finite. In one embodiment, users can create and define the behavior states and manually assign web pages and web sites to specific behavior states. This approach may be particularly useful in the intial stages of state predictor 130 as it begins to watch user behavior and classify behavior. Over time, however, more and more of the classification can be done dynamically by state analyzer 134. State analyzer 134 can extract metadata from a web page and use that information to classify it. For example, if a particular type of sports web page always includes a "box score" metadata tag, then state analyzer 134 creates a "box score" behavior state. Accordingly, when users are browsing a page with that particular metadata tag, the state predictor can reasonably predict that a user is in a box score state and show predictive data based on the user's current behavior state.

Furthermore, it may index and store web page addresses that have "box score" metadata tags as items indicative of the "box score" behavior state in behavior state repository 135.

In one embodiment, search results may be used by state analyzer 134 to populate behavior state repository 135. For example, a number of algorithms exist to extract keywords from web pages. Once a behavior state has been identified and created, high ranking search results on a search results list generated by executing a search query using the behavior state's label may also be indexed according to the behavior state. In other embodiments, different techniques may be user to determine behavior states.

It should be noted, that the behavior state analysis of the clickstream does not need to be limited to neighbor web pages (e.g., two web pages that appear next to each other in the clickstream). For example, suppose the clickstream indicates that a user was browsing a web page in a "box score" state, the user then navigates to a different web page, and then navigates to a "game recap state". State analyzer 134 may ignore the intervening web page, especially if the user did not spend time browsing the page and returned quickly to either the original "box score" page or to the "game recap" page that includes articles and expert opinions on the game. Although, it should be noted that the distance between two behavior states in the clickstream should be a factor in determining whether two behavior states constitute a pattern or trend in user browse histories and whether the two web pages should be associated together as behavior state data. For example, if a user accesses the box score web page and five hundred clicks later accesses the game recap web page, then the association between the box score and game recap states is likely very weak.

When state analyzer 134 identifies a transition from the "box score" state to the "game recap", it stores that transition in behavior state repository 135. If enough users make similar types of transitions from a "box score" state to a "game recap" state then the state analyzer may determine that "box score" state is indicative of the "game recap" state and link the two together. In other words, when a user is in a "box score" state, state analyzer determines that there is a good probability that the user will transition into the "game recap" state. Accordingly, the state relationship is stored in behavior state repository 135. As more data is accumulated and patterns identified the more accurate the predictive behavior becomes.

In one embodiment, state analyzer may also receive basic demographic information about a user. This information can be culled from the user's registration information or in some other way. User demographics provide a nice starting place to determine a user's behavior state. For example, it is unlikely that an elderly lady would be very interested in purchasing hip-hop music albums. Similarly, children under the age of 18 are unlikely to be interested in purchasing hearing aids. At the same time, the elderly demographics may be interested in finding out information about prescription drugs. Thus, at the outset, knowing a user's demographics can help the system customize the predictive information it displays to the user.

In the end, state analyzer 134 evaluates a variety of factors to determine the relevance and the strength of association between web pages and behavior states. Some factors to evaluate the relevance and strength of the association between two behavior states include the number and/or percentage of users who access one state and then the other, the user demographics, the time and number of clicks between accessing the two behavior states, the computing resources available to analyze and filter the clickstream data, user-based linkings, and other such factors. Once a set of states has been created, then state predictor 130 can use that information to display predictive data to users.

Predictive Model Module

In one embodiment, predictive model module (PMM) 140 is a component of state predictor 130. It implements well established and proven algorithms for web user behavior modeling. In one embodiment, PMM implements hidden Markov models (HMM). Hidden Markov models are well-known for their application in temporal pattern recognition such as speech, handwriting, gesture recognition, musical score following and bioinformatics because they do a good job of modeling the probability of a sequence of events. Moreover, according to one embodiment, HMMs are used here because they provide robust parameter estimation, model complexity selection algorithms, adaptation algorithms from user-independent behavioral models, fast detection (decoding) algorithms, and excellent training methods (e.g., Expectation-Maximization algorithm)

An HMM consists of a finite set of states, each of which is associated with a (generally multi-dimensional) probability distribution. Transitions among the states are governed by a set of probabilities called transition probabilities. In a particular state an outcome or observation can be generated, according to the associated probability distribution of the current state.

Here, PMM 140 implements HMMs to predict user behavior because over time PMM has access to a vast store of information that tracks user web browsing behaviors (at both the individual and group scale). Using that information, PMM can determine transition probabilities for each behavior state even though the PMM does not know exactly what the user intends. PMM 140, however, can make pretty good guesses. For example, suppose a user accesses a sports web site to look at a box score. As noted above, state analyzer 134 has identified a "box score" state and tracked what other states users access after looking at a box score page. That information lends itself well to calculating transition probabilities. For example, if 30% of users navigate from a "box score" state to a "game recap" state the transition probability of the user switching from the "box score" state to the "game recap" state is known, it is 30%. In addition to the "game recap" state, state analyzer 134 may also have computed the probability of switching into other states as well.

Accordingly, when PMM 140 detects that a user is accessing a particular web page, it looks to see what state that indicates the user is in. PMM 140 can find that information in behavior state repository 135. Then based on the probability of the user jumping to a different behavior state, PMM 140 can select predictive data to show to the user. In one embodiment, the predictive data can include sponsor-information.

According to one embodiment, PMM 140 may customize the predictive data even further based on information collected about the user himself and the user's browsing patterns.

In one embodiment, PMM 140 is implemented in combination with other techniques and mechanisms that are useful for efficiently and effectively estimating parameters of statistical models. Specifically, the Expectation-Maximization algorithm is a particularly effective training method for HMMs. And adaptation methods can be used to maximize the ability of the HMMs to detect, classify, and predict with limited training data. These techniques and mechanisms can produce user-adapted behavior models that start with user-independent behavior models and a (often limited) set of user-dependent observed data.

Furthermore, Viterbi methods may be used to further refine the way system 100 classifies and generates predictive data.

In one embodiment, dynamic modeling of state transitions can be formed in a nested, hierarchical fashion with multi-temporal modeling, where slower varying temporal transitions are modeled separately at the highest levels of the hierarchy from the faster varying temporal transitions towards the "leaves" of the hierarchical tree. Stated another way, behavior states may have "sub-states" that can either be modeled by another HMM at a lower (faster changing transitions) level or as a static probabilistic model (e.g., mixture models). And higher levels in the hierarchy could be model transitions between "sequences" of HMMs with higher-level HMMs, or n-gram statistical models.

Display Predictive Data

When predictive data is received by browser 110 from state predictor 130, the predictive data is displayed to the user in a display interface. In one embodiment, the display interface is a user interface control by browser 110. Alternatively, the display interface is a user interface created by the browser extension 115, such as a pop-up window, pull-down menu, or a button on a toolbar.

The amount of predictive data and how it is ordered in the display interface varies based on implementation. In one embodiment, the user can selectively choose how much predictive data is shown in the display interface. For example, browser extension 115 includes controls that allow the user to choose how many lines of predictive data are to be displayed in the display interface. Basically, the display interface should be customizable to allow the user to determine how much predictive data is displayed.

Procedure for Displaying Predictive Data

Figure 2:
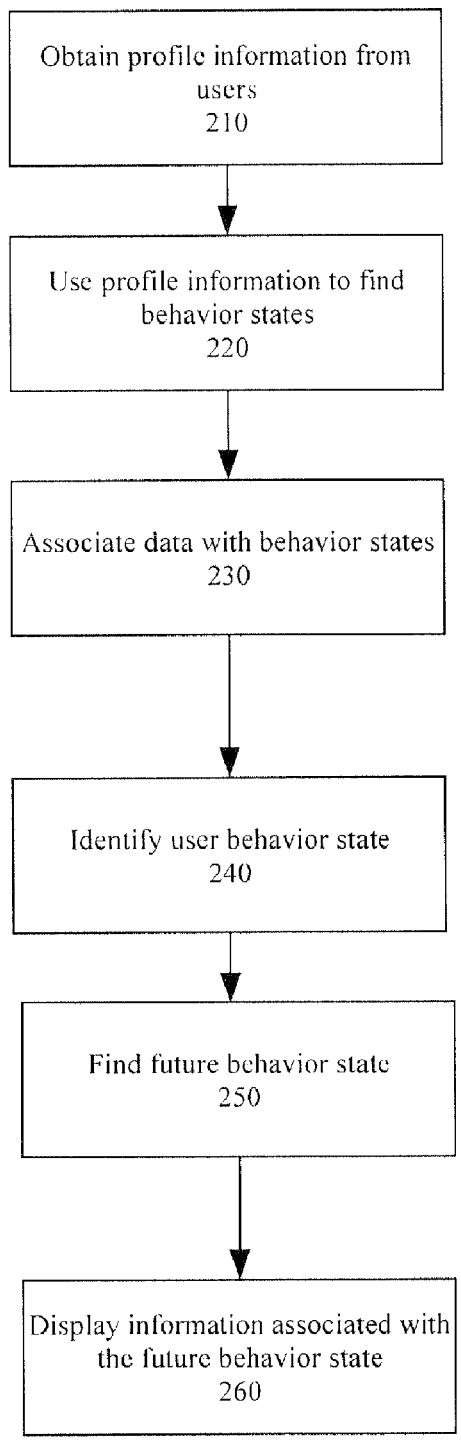
FIG. 2 illustrates an example user interface for a toolbar that implements an embodiment of the invention.

FIG. 2 illustrates an example procedure 200 for collecting, classifying, modeling, and displaying predictive data. To illustrate procedure 200, consider the example of John. John is a typical computer-user who wants to buy a new computer over the Internet. To buy his computer, John accesses the Internet through a browser with an integrated toolbar, like browser 110 with browser extension 115. The toolbar includes a tracking mechanism, such as tracking module 120, to track John's Internet usage and send the tracked data (e.g., clickstream data) to a state predictor 130.

At step 210, profile information about John can be collected by a search engine or, alternatively, by a system like system 100 in order to customize his web browsing experience. However, as John begins to browse the web for information about computers, John is concerned about protecting what personal information is allowed to be sent over the Internet. Accordingly, the toolbar installed by John does not track any information unless John opts to have his Internet usage tracked. In one embodiment, John agrees to have his web browsing activity recorded when he registers for an online account with a search engine. Accordingly, once John has registered and logged into his online search engine account the toolbar's tracking mechanism begins to collect clickstream data about the web pages he visits. While John is not registered (or not logged in) his browsing activity is not tracked. Moreover, in one embodiment, the toolbar includes a button that allows John to selectively control when clickstream data is collected. For example, once logged into his search engine account, John may yet decide he does not want his Internet activity tracked while he provides credit card and other sensitive financial information to an online computer retailer. Therefore, before purchasing a computer, John may click on a "stop tracking" button on the toolbar to stop the collection of clickstream data until he decides to allow the tracking mechanism to start recording his browsing activity again.

In one embodiment, certain statistics gathered at the time of registration such as a user's age, sex, race, etc. may be collected to identify the demographics of users accessing a web page. That information may be used to refine clickstream data that may be of interest to particular demographic groups or it may be used to help determine behavior states a user may be interested in.

In one embodiment, the toolbar does not record any personal information (e.g., name, passwords, credit card information, etc.). In this embodiment, the toolbar's tracking mechanism merely records information about John's Internet usage, e.g., the web pages he visits, the time he spends on a page, etc. Note that the filtering of personal information could be done by the tracking mechanism. For example, the toolbar in John's web browser provides user interface controls that allow John to specify specific types of information that should be filtered and excluded from being collected in the clickstream data. Thus, John may elect to have his name, credit card information, and other private information be excluded from ever being collected. In one embodiment, the clickstream data is submitted anonymously by the tracking mechanism to the state predictor.

The process of capturing the clickstream data involves capturing URLs and other information associated with web pages accessed by John. For example, when John accesses a banking web page, the address and other clickstream data is captured and recorded by the tracking mechanism. From the banking web page, John navigates to a new page. The transition from the banking web page to the new web page is recorded. As John navigates from web page to web page, each transition is recorded so it can eventually be evaluated to find trends and create associations between web pages.

Periodically, the clickstream data collected from John's browsing activity is forwarded by the tracking mechanism to the search engine. In one embodiment, the tracking mechanism facilitates the transmission of the clickstream data to the search engine by establishing an interface between John's web browser and the search engine.

Once the interface has been created, the clickstream data collected by the tracking mechanism is sent to the search engine, where it is stored with the user browse histories of other users. In one embodiment, the clickstream data is accumulated into a repository such as clickstream repository 132 described in connection with FIG. 1. Then, the clickstream data is analyzed.

At step 220, a state analyzer, such as the state analyzer 134 described in connection with FIG. 1, analyzes the clickstream data in order to find behavior state patterns in John's browse history. The resulting patterns can be stored as behavior state data in a repository, such as behavior state data repository 135 described in connection with FIG. 1. That data can also be combined with data from other users for general state patterns that can apply to a broader scope of users.

At step 230, after state patterns have been classified, additional data such as web pages, search query terms, and other such data can be associated with behavior states. In this way, when those features are input by subsequent users, the system can identify a behavior state for the subsequent user. It should be noted that when the system receives clickstream data and analyzes the data, the behavior state data stored in the repository, in one embodiment, is dynamically updated as new data is received.

At step 240, the system identifies John's behavior state. For example, if John accesses computer retailer A's web page to find out information about their products, the system detects that John is in a "find computer information" state. The system can deduce this because it has tracked a number of users who visited the same site for similar reasons. If John later accesses computer retailer B's web page, the state predictor evaluates that information and determines that John is still in the same state.

At step 250, the system finds a next behavior state that includes information John may be interested in. For example, since the system has deduced that John is looking for a computer. It looks to see what other users have done after they finished looking at computers. In the behavior state database, the system may find a number of different states that may be possible future states. The system determines which is most probable. In this case, based on John's past browsing history and based on the fact that a significant number of users access computer retailer A's web page and then click on a "Customize Computer" option. In other words, other users have frequently transitioned from a "find computer information state" to a "buy computer" state.

At step 260, the system looks up predictive data associated with the "buy computer" state and displays it to John. In one embodiment, the predictive data includes links to computer retailers, discount coupons on software, and other information that John may find useful or interesting. The predictive data may also include links to information in less probable states.

The actual presentation of the predictive data can vary. For example, in one embodiment, the display interface for the predictive data includes controls that allow the user to set preferences as to how the predictive data is displayed. Alternatively, the predictive data is displayed in the ad portions of a web page.

In one embodiment, all users have access to predictive data through a standard search engine interface. For example, when a subsequent user, Richard, performs a search query in a search engine, the search results can include more than just standard search engine data results. The search results can be enhanced to include all the various forms of predictive data as described herein. In this way, searching and navigating techniques are improved.

Hardware Overview

Figure 3:
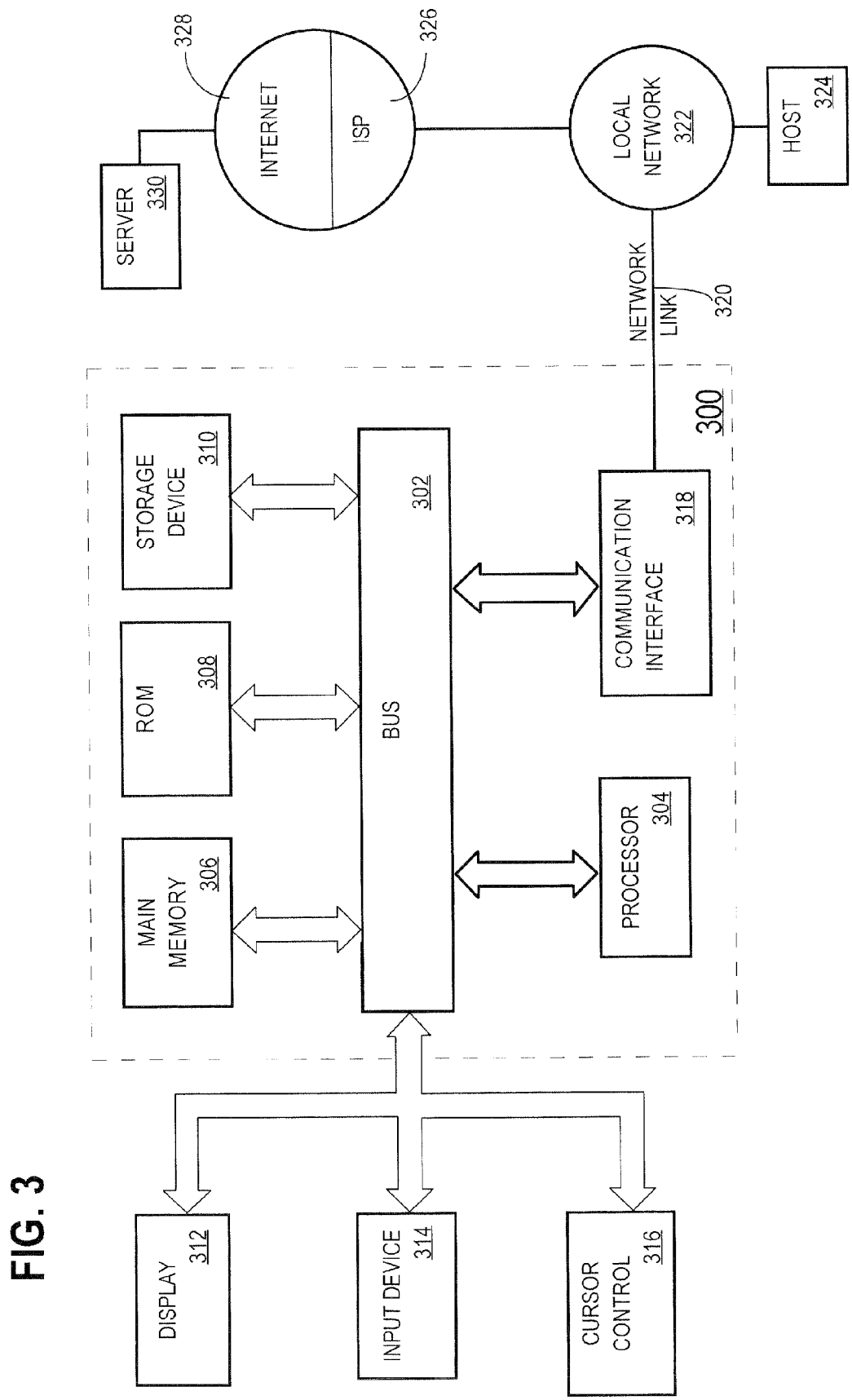
FIG. 3 is a block diagram of a computer system on which implementations of the present invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one implementation of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for providing targeted data, the method comprising:
   maintaining state transition information for a plurality of states, wherein the state transition information indicates state-to-state transitions made by one or more users as the one or more users navigate from web resources associated with one state to web resources associated with other states;
   wherein a first state of the plurality of states is associated with a first plurality of web resources;
   wherein a second state of the plurality of states is associated with a second plurality of web resources that are different than the first plurality of web resources;
   receiving a request, by a first user, to retrieve a particular web resource;
   in response to receiving the request, determining that the particular web resource is in the first plurality of web resources that are associated with the first state;
   based on the particular web resource being associated with the first state, determining that, having requested the particular web resource, the first user is in the first state:
   in response to determining that the first user is in the first state, inspecting the state transition information to determine a next state associated with said first state;
   generating predictive data in association with the next state;
   based on the state transition information indicating that the next state is the next state associated with the first state, causing at least a portion of said predictive data associated with the next state to be displayed to the first user;
   wherein the method is performed by one or more computing devices.

2. The method of claim 1, wherein inspecting the state transition information to determine a next state associated with said first state comprises executing a predictive model to select the next state.

3. The method of 2, wherein the predictive model is a hidden Markov model.

4. The method of claim 1, wherein the state-to-state transitions are specific to the first user.

5. The method of claim 1, wherein:
   said portion of said predictive data includes a web resource; and
   causing at least a portion of said predictive data associated with the next state to be displayed to the first user includes causing said web resource to be displayed by a web browser.

6. The method of claim 1, further comprising anonymously updating the state transition information to record that a user navigated from the first state to the second state.

7. The method of claim 1, further comprising updating the state transition information to record that a user navigated from the first state to the second state, wherein updating includes receiving an indication of consent from the user before state transition information is recorded.

8. The method of claim 1, wherein inspecting the state transition information to determine a next state associated with said first state includes evaluating the state-to-state transitions to find a common pattern of state access among the one or more users.

9. The method of claim 1, wherein the second state corresponds to the next state.

10. A volatile or non-volatile machine-readable storage medium storing instructions for providing targeted data to a set of users, wherein the instructions, when executed by one or more processors, cause the one or more processors to perform:
   maintaining state transition information for a plurality of states, wherein the state transition information indicates state-to-state transitions made by one or more users as the one or more users navigate from web resources associated with one state to web resources associated with other states;
   wherein a first state of the plurality of states is associated with a first plurality of web resources;
   wherein a second state of the plurality of states is associated with a second plurality of web resources that are different than the first plurality of web resources;
   receiving a request, by a first user, to retrieve a particular web resource;
   in response to receiving the request, determining that the particular web resource is in the first plurality of web resources that are associated with the first state;
   based on the particular web resource being associated with the first state, determining that, having requested the particular web resource, the first user is in the first state;
   in response to determining that the first user is in the first state, inspecting the state transition information to determine a next state associated with said first state;
   generating predictive data in association with the next state;
   based on the state transition information indicating that the next state is the next state associated with the first state, causing at least a portion of said predictive data associated with the next state to be displayed to the first user.

11. The machine-readable storage medium of claim 10, wherein inspecting the state transition information to determine a next state associated with said first state comprises executing a predictive model to select the next state.

12. The machine-readable storage medium of 11, wherein the predictive model is a hidden Markov model.

13. The machine-readable storage medium of claim 10, wherein the state-to-state transitions are specific to the first user.

14. The machine-readable storage medium of claim 10, wherein:
said portion of said predictive data includes a web resource; and
causing at least a portion of said predictive data associated with the next state to be displayed to the first user includes causing said web resource to be displayed by a web browser.

15. The machine-readable storage medium of claim 10, wherein the instructions, when executed by the one or more processors, further cause anonymously updating the state transition information to record that a user navigated from the first state to the second state.

16. The machine-readable storage medium of claim 10, wherein the instructions, when executed by the one or more processors, further cause updating the state transition information to record that a user navigated from the first state to the second state, wherein updating includes receiving an indication of consent from the user before state transition information is recorded.

17. The machine-readable storage medium of claim 10, wherein inspecting the state transition information to determine a next state associated with said first state includes evaluating the state-to-state transitions to find a common pattern of state access among the one or more users.

18. The machine-readable storage medium of claim 10, wherein the second state corresponds to the next state.

19. The method of claim 1, wherein:
the state transition information indicates that the first state transitions to a third state of the plurality of states and, alternatively, to a fourth state of the plurality of states;
inspecting the state transition information to determine a next state associated with said first state includes determining one of the third state or the fourth state;
said next state is one of the third state or the fourth state.

20. The method of claim 19, wherein:
the transition to the third state from the first state is associated with a first probability;
the transition to the further state from the first state is associated with a second probability that is different than the first probability; and
determining one of the third state or the fourth state is based on the first and second probabilities.

21. The method of claim 1, wherein said portion of said predictive data includes one or more of the following: a link associated with said next state, an advertisement associated with said next state, or sponsor-based data associated with said next state, wherein said sponsor-based data includes data, submitted by one or more sponsors, that is to be displayed when a set of one or more users are determined to be in a particular state.

22. The method of claim 21, wherein said portion of said predictive data includes an advertisement associated with said next state.

23. The machine-readable storage medium of claim 10, wherein:
the state transition information indicates that the first state transitions to a third state of the plurality of states and, alternatively, to a fourth state of the plurality of states;
inspecting the state transition information to determine a next state associated with said first state includes determining one of the third state or the fourth state;
said next state is one of the third state or the fourth state.

24. The machine-readable storage medium of claim 10, wherein:
the transition to the third state from the first state is associated with a first probability;
the transition to the further state from the first state is associated with a second probability that is different than the first probability; and
determining one of the third state or the fourth state is based on the first and second probabilities.

25. The machine-readable storage medium of claim 10, wherein said portion of said predictive data includes one or more of the following: a link associated with said next state, an advertisement associated with said next state, or sponsor-based data associated with said next state, wherein said sponsor-based data includes data, submitted by one or more sponsors, that is to be displayed when a set of one or more users are determined to be in a particular state.

26. The machine-readable storage medium of claim 25, wherein said portion of said predictive data includes an advertisement associated with said next state.

* * * * *

UNITED STATES PATENT AND TRADEMARK OFFICE
CERTIFICATE OF CORRECTION

PATENT NO. : 7,941,383 B2  Page 1 of 1
APPLICATION NO. : 11/962753
DATED : May 10, 2011
INVENTOR(S) : Larry P. Heck It is certified that error appears in the above-identified patent and that said Letters Patent is hereby corrected as shown below:

COLUMN 18

Claim 20: At line 3 delete "further" and insert --fourth--.

Claim 24: At line 32 delete "further" and insert --fourth--.

Signed and Sealed this
Fourteenth Day of June, 2011

David J. Kappos
*Director of the United States Patent and Trademark Office*